United States Patent [19]
Arn et al.

[11] 4,063,234
[45] Dec. 13, 1977

[54] INCANDESCENT, FLAT SCREEN, VIDEO DISPLAY

[76] Inventors: Robert M. Arn, 41 Main Street; Glen F. Waszek, 20 Algonquin Avenue, both of Toronto, Ontario, Canada

[21] Appl. No.: 603,043

[22] Filed: Aug. 8, 1975

[51] Int. Cl.² ............................................. G09F 9/32
[52] U.S. Cl. ................................. 340/334; 340/340; 358/240
[58] Field of Search ................. 340/334, 324 M, 340; 178/7.3 D

[56] References Cited

U.S. PATENT DOCUMENTS

| | | | |
|---|---|---|---|
| 3,273,140 | 9/1966 | Foster et al. ........................ | 340/334 |
| 3,761,617 | 9/1973 | Tsuchiya et al. ................... | 178/7.3 D |
| 3,845,243 | 10/1974 | Schmersal et al. ............. | 340/324 M |
| 3,883,778 | 5/1975 | Kaji et al. .......................... | 178/7.3 D |

*Primary Examiner*—Marshall M. Curtis
*Attorney, Agent, or Firm*—Donald E. Hewson

[57] ABSTRACT

A memory and driver circuit for each lamp of a flat screen video display apparatus which comprises a plurality of addressable incandescent lamps arranged in an X-Y matrix is provided. The gray scale visual effect of the video information being presented comes as a result of controlling the length of time of illumination of each lamp. Each of the lamps is connected in series with a source of power and a switchable solid state device such as an SCR or a transistor. When the source of power is an alternating current source where each of the pulses has its initial slope always in the same sense with respect to zero, the circuit is arranged with negative-going video information so that the lamps are held off — i.e., black — in the presence of a video signal above a threshold, and are thereafter turned on. Phase modulation is thereby provided. When the source of power is direct current, each lamp is illuminated when there is a video signal intended for that lamp and above a predetermined reference level. Pulse width modulation is provided in this case.

10 Claims, 6 Drawing Figures

INCANDESCENT, FLAT SCREEN, VIDEO DISPLAY

FIELD OF THE INVENTION:

This invention relates to a flat screen video display, particularly of the sort comprising a plurality of incandescent lamps arranged in an addressable X-Y matrix. More particularly, this invention provides a memory and driver circuit for each individual incandescent lamp in such a flat screen video display apparatus.

BACKGROUND OF THE INVENTION:

It has long been known that television techniques — particularly with the advent of video tape recording — can be adapted to a number of types of display other than broadcast television program material. In particular, because of the ease of editing, the wide variety of equipment that is available, the split-screen and superimposition techniques and other effects that can be easily accommodated using television equipment, the adaptation of television techniques to such diverse fields as billboard advertising, score boards and replay boards for sports stadia, screens for showing closed circuit sports and entertainment program material, and the like, is entirely practicable. However, the known devices for presenting the flat screen video display of the program material once it has been photographed, recorded, edited or devised using television techniques, are for the most part inadequate.

Many of the known, large scale video display screens and other apparatuses employ television projection apparatus, which by its very nature is extremely sensitive — being very carefully optically adjusted — and which also suffer from a lack of brightness as the screen size is enlarged to any reasonable size. Other devices employ a plurality of liquid crystals or gas discharge devices, or the like, but require enormous amounts of power to drive them and extremely complicated addressing and driving systems. For example, U.S. Pat. No. 3,329,831 in the name of Fuji Neon K.K. shows the production of video pictures using discreet elements, where vertical gating signals and horizontal writing signals are imposed upon a grid. However, that system has only limited gray scale capabilities. Another patent of interest in the prior art is Sobel U.S. Pat. No. 3,714,374 dated Jan. 30, 1973. That patent comtemplates the use of different light-display elements in a flat panel image display including liquid crystals. Sobel, for about the first time, recognizes the requirement for an energy storage device such as a capacitor, either inherent or supplemental, at each light-display element. However, Sobel also requires the use of breakdown-type switches such as ovons; and because of the power requirements, is limited in size.

Another problem that has occurred in the prior art devices is any reasonable gray scale capabilities, coupled with the ability to cluster light-display elements in such a way as to use colour television technology such as the three-colour technology which is standard in North America. All of this must, of course, be capable of being accomplished with reasonable power consumption. In order to accomplish this, it has so far been seen to be necessary to use incandescent lamps together with memory and driver circuit means for each lamp in the array. However, because incandescent lamps do not have energy storage capabilities, the usual approach has been to provide energy storage outside of the drivers and to use complicated synchronization to bring the video information and the power to each point in an array at the same time.

In contradistinction thereto, the present invention comtemplates the provision of memory/driver circuits where both the memory capabilities for the video information for each displayelement in the array and the driver circuits for providing the necessary power to the lamp at that point are included in the same circuit, and where the memory in fact gates the power switching device. In this way, gray scale capabilities are easily provided.

It must be mentioned that, in respect of gray scale capabilities using incandescent lamps, the turn-on and turn-off times of such lamps are sufficiently fast that the lamp comes to its required brilliance very quickly and subsides therefrom sufficiently quickly that no "ghosting" appears, as discussed in greater detail hereafter. The gray scale capability is accomplished by controlling the period of time for which the lamp has been illuminated; the bright end of the gray scale being accomplished by having the lamp continuously or nearly continuously illuminated, and the dark end of the gray scale being accomplished by having the lamp not illuminated or illuminated only for a very short period of time. It has been discovered that, if discreet levels of gray scale information are to be utilized as discussed in greater detail hereafter, sixteen such levels are sufficient — and, of course, sixteen levels of information can be easily accomplished using four-line, sixteen-bit binary counting. Gray scale capabilities can also be provided using either phase or pulse width modulation of video signals; and it has been determined that such modulation over a period of 1/60 sec. provides ample control with the persistence of the image being retained sufficiently long by the eye of the viewer as to be satisfactory.

In providing the memory and driver circuits of the present invention — for the sake of simplicity, sometimes referred to as memory/driver circuits — this invention contemplates the use of either AC or DC power sources from which each lamp in an array may be powered. By so doing, this invention contemplates the use of either positive-going or negative-going video information, as required; and contemplates the use of such solid state switching devices as power transistors or SCR's. Also, the present invention is such that various sampling times can be accommodated, depending upon the resolution that is required. Thus, an acceptable television picture can be obtained using an array of not more than 25 × 30 lamps, where the resolution of a standard 525-line picture is quite coarse; and on the other hand, this invention also contemplates billboard-size video display apparatuses having full colour capabilities and using in excess of 20,000 incandescent lamps. The resolution in such displays is quite fine — being nearly dot-for-dot in comparison with an ordinary North American colour television screen. Thus, the sampling time for each element in a total array must be such as to accommodate all of the elements which are to display video information during each cycle of operation of the apparatus.

To accomplish the above, this invention provides a memory/driver circuit for each lamp of a plurality of incandescent lamps used in a flat screen video display apparatus, where each of the lamps is individually addressable in an X-Y matrix, and where video information for each lamp is derived from a television signal and displayed by illuminating the lamp for a controlled period of time so as to give visual gray scale effects according to the length of time of illumination of the lamp, where the lamp is connected in series with a source of power, consisting of means for detecting and storing a video signal, and comparator means to drive a solid state switching means which controls the period of time for which the lamp shall be illuminated. The means for detecting and storing a video signal are such that the video signal being detected and stored is that which is intended for display at that lamp at the next time that the lamp may be illuminated; in other words, if it is intended that the lamp shall be very bright, a suitable video signal is detected and stored, and likewise if it is determined that the lamp shall not be bright — i.e. black — another suitable video signal is detected and stored. The means for detecting and storing a video signal may be continuously connected to the source of video signals, but are operative only upon the coincidence of horizontal and vertical (or X and Y) enabling signals which turn on the remainder of the circuit. The comparator has inputs from the means for detecting and storing video signals and also from reference signal means, and is adapted to give an output signal when the values of the video signal and the reference signal are coincident. The timing of the coincidence of the reference and video signals in each cycle of operation of the memory/driver circuit is, of course, a function of the value of the video signal which was fed to the means for detecting and storing the video signal at the beginning of that cycle of operation. Thus, the solid state switching means is connected to the output of the comparator and in series with the lamp and the source of power so that when the solid state switching means becomes conductive, the lamp is illuminated. The period of illumination of the lamp is thereby controlled.

Where the video signal is an analogue signal, means are provided to sample that signal for a sufficient length of time that all of the lamps to be illuminated during a cycle of operation of the video display apparatus are sequentially provided with the video information. Where the solid state switching device is an SCR and the source of power is an alternating current source such that each pulse of power has an initial slope which is always in the same sense with respect to zero voltage, all of the lamps which are to display video information during a given cycle of operation of the apparatus — or at least their respective memory/driver circuits — are made operative at the same time. Where the source of power is a direct current, each individual memory/driver circuit becomes operable when it is addressed with the video information intended for it.

Where the video information intended for any given lamp is a discreet multi-bit video signal level, suitable encoding means must be provided. Also, countup or countdown — usually countdown — circuits are provided so that the discreet video signal level information can be read into a decade counter and released from the decade counter upon the coincidence or O,O signal therefrom when the digital count and the discreet video signal level are coincident.

BRIEF SUMMARY OF THIS INVENTION

It is an object of this invention to provide a flat screen video display apparatus of the sort which may be operated having reasonable power requirements even in very large scale, and having full colour and gray scale capabilities.

Another object of this invention is to provide a memory and driver circuit for a flat screen video display apparatus of the sort comprising a plurality of incandescent lamps, where the memory and driver circuit may be adaptable for use in an AC or a DC operation — i.e., where the power by which the lamp is illuminated may be AC or DC — and where the video signal may be analogue or digital.

A still further object of this invention is to provide memory/driver circuits for flat screen, incandescent, video display apparatus where the memory/driver circuits may be easily and economically produced.

Yet another object of this invention is to provide an incandescent, flat screen, video display apparatus and memory/driver circuits for each of the incandescent lamps thereof, where the size of the apparatus and the number of lamps used in the apparatus may vary from only several hundred lamps with very coarse resolution to many thousands of lamps having fine resolution of picture information.

BRIEF DESCRIPTION OF THE DRAWINGS:

These and other objects and features of the invention are discussed in greater detail hereafter, in association with the accompanying drawings, in which.

Figure 1:
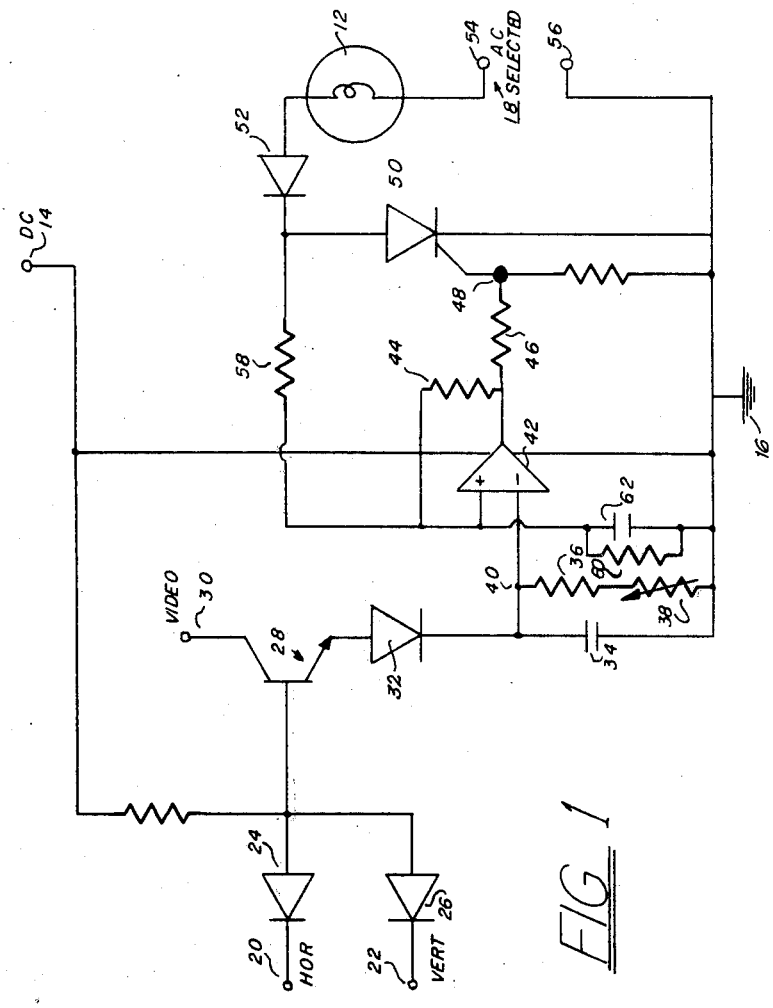
FIG. 1 is the circuit of a first embodiment of an AC operating memory and driver circuit according to this invention.

DESCRIPTION OF THE PREFERRED EMBODIMENTS:

FIG. 1 shows a memory and driver circuit for each lamp of a flat screen video display apparatus of the sort which comprises a plurality of incandescent lamps. The circuit, 10, is such that the lamp 12 has its own control circuitry to modulate the power which is fed to the lamp and by which the lamp is thereby illuminated. The circuit has a DC portion, connected between a positive DC terminal 14 and ground indicated at 16; and a selected AC power source 18 which is discussed in greater detail hereafter. The operation of the individual circuit 10 is as follows:

Upon the coincidence of horizontal and vertical synchronization signals at terminals 20 and 22 respectively — which signals are passed through diodes 24 and 26 — the base of transistor 28 is biased so that the transistor is turned on. It will be noted that the collector of transistor 28 is connected to a video terminal 30; and that the emitter of the transistor 28 is connected through a diode 32 to an RC circuit comprising capacitor 34 and resistor string 36,38. The transistor 28 therefore functions as a video pass switch, so that video information from terminal 30 may be passed to the memory/driver circuit 10 only when horizontal and vertical sync signals are coincident to bias the video pass transistor to a conductive state. During the time that the video pass switch or transistor 28 is conductive, the video information intended to be displayed at lamp 12 is stored in capacitor 34 as a charge thereon. When the transistor 28 is rendered non-conductive, capacitor 34 immediately starts to discharge through the resistor string 36,38, so that the voltage at point 40 which is connected to one of the input terminals of a comparator 42, immediately begins to decay. The characteristic of the voltage decay at point 40 is, of course, the characteristic of the parallel RC circuit comprising capacitor 34 and resistor string 36,38. The comparator 42 may conveniently be an op-amp of the sort which are readily obtainable. The op-amp is also connected to DC terminal 14 and ground 16, and has a feedback resistor 44. The output of the comparator 42 is connected through resistor 46 to the gate terminal 48 of SCR 50. It will be noted that the anode, in this case, of SCR 50 is connected in series with a blocking diode 52 which is provided solely to protect the memory circuit in the event of a rectifier failure, and the lamp 12 to the power source 18. Thus, it will be seen that when the power source is of the correct polarity — i.e., in this case when terminal 54 is positive with respect to terminal 56 — the diode 52 is rendered conductive and SCR may be conductive depending upon the condition of the output of comparator 42. If the output of comparator 42 is high, then the SCR 50 is fired and is conductive, so that the lamp 12 and SCR 50 are in series with the power source 18, and the lamp is thereby illuminated. If the output of comparator 42 is low, and the SCR has not been fired during the half cycle of operation as discussed in greater detail hereafter, then the SCR 50 represents an open circuit and the lamp 12 is not illuminated.

It will be noted, however, that a circuit does exist through the lamp 12 and diode 52 to resistor 58 and a parallel RC circuit comprising resistor 60 and capacitor 62. The values of resistor 58 and the other components is such that a very low current is drawn through the lamp 12 and is not sufficient to cause any illumination of the lamp. However, it will be noted that the RC circuit 60,62 has a rising characteristic as the capacitor 62 is charged. It will be seen, therefore, that the output of comparator 42 will be dependent upon the coincidence of the decay of voltage at point 40 and the rise of voltage on capacitor 62; and that until such time as the voltage at point 40 falls sufficiently or the voltage on capacitor 62 rises sufficiently that the coincidence of those voltages occurs, the comparator 42 remains off, or with a low output. When the voltages are coincident, the comparator becomes conductive and the output goes high, whereupon the gate of the SCR 50 is activated and the SCR is fired and becomes conductive. Capacitors 34 and 62 are, of course, discharged; and at the same time as the output of the comparator 42 goes high, the lamp 12 is illuminated. Such operation requires a negative going video signal characteristic, because the illumination of lamp 12 is dependent upon the absence of a video signal below a certain level as determined by the voltage on capacitor 62. In any event, with respect to the operation of the single memory/driver circuit 10 shown in FIG. 1, it will be seen that the lamp 12 becomes illuminated upon the coincidence of voltage levels at point 40 and across capacitor 62 as discussed above.

It must be recalled, however, that the memory/driver circuit 10 shown in FIG. 1 is only one of many hundreds or thousands of similar circuits. In the usual operation of a plurality of circuits according to FIG. 1, it must be noted that none of the lamps 12 can be illuminated until such time as the SCR's 50 are conditioned to be fired. The conditioning of SCR's 50 can only occur when terminal 54 is positive with respect to terminal 56 as they are shown in FIG. 1 and when the polarity of SCR 50 is as indicated. The sampling time for each memory/driver circuit 10 according to FIG. 1 is determined by the charging period of the capacitor 34; and that charging period is, in turn, determined by the number of lamps along each horizontal line which are to be addressed during one line reading period. For example, using North American television standards, there are approximately 52$\mu$ sec. of useful video information for each line reading period; and if the array is such that 100 lamps are in each horizontal line, then the sampling time for each memory/driver circuit for each lamp is approximately 520$\eta$ sec. Of course, there are additional synchronization pulses in each line of information, which are blocked using suitable standard television circuits.

The conditioning of SCR 50 is, as noted above, at each zero crossing when terminal 54 becomes positive with respect to terminal 56. By the same token, the SCR's 50 are extinguished when the voltage between terminals 54 and 56 reduces to zero. It is noted that the control of the period of illumination for each lamp 12 is, indeed, phase modulation with respect to the pulse of AC voltage having the requisite conditions as stated above. However, because the control of the illumination of each of lamps 12 is, indeed, by phase control of the power pulses that might illuminate those lamps, the read-out and operation of the lamps must be referenced to AC zero crossing point. That is, at some moment in time, the AC power to the video display apparatus will cross zero; and it is most unlikely that that moment in time will occur at exactly the same moment as a scan of a video picture begins at the upper left corner. In other words, the zero crossing point will occur somewhere in mid-picture. In other words, it is unlikely that a vertical sync pulse and the zero crossing point of the 60 Hz power supply will coincide.

It is therefore necessary that the video information for one complete screen display must be read into the memory/driver circuits for the entire screen before the screen can be turned on and that particular picture displayed. Because the zero crossing point is likely to occur somewhere in mid-picture, and in view of the interlacing of normal television camera operation, it is necessary to block the delivery of AC pulses to terminals 54 and 56 for two half cycles and to permit the delivery of an AC pulse for one half cycle. In other words, the SCR's 50 are conditioned only once in every three half cycles for illumination of their respective lamps 12. Thus, power to illuminate the lamps 12 is delivered only once in every three half cycles. However, because of the interlacing and the likelihood of the zero crossing point occurring somewhere in mid-picture, the picture which is displayed when the SCR's are conditioned is an integrated picture with respect to the television information from which that picture was derived.

It is now seen that the ramping of the voltage on capacitor 62 is most important, in order that a picture of even brightness across the entire screen may be derived. This, of course, is accomplished by adjusting the levels of the inputs to comparator 42, particularly by adjustment of resistor 38. However, it should also be noted that such adjustment needs to be made only once.

It should also be noted that a fixentire screen would have to be adjusted when the screen is first illuminated.

The selected AC voltage between terminals 54 and 56 is, as noted, once in three half cycles; so that appropriate circuitry must be provided to feed terminals 54 and 56 with the first half cycle of one cycle of supply power and the second half cycle of the next cycle of supply power, and so on. Thus, each pulse of alternating current which is supplied to terminals 54 and 56 has the same initial slope — i.e., positive-going in this case — with respect to zero voltage.

Figure 2:
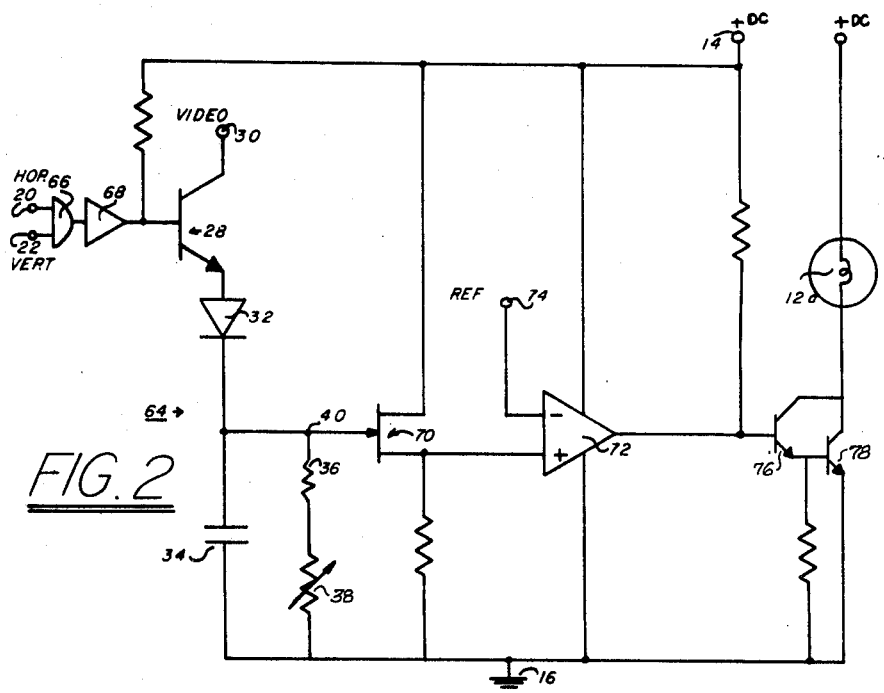
FIG. 2 is a circuit similar to FIG. 1 showing a DC operating memory and driver circuit according to this invention.

Turning now to the circuit of FIG. 2, it will be noted that there are some similarities with respect to that circuit with the circuit of FIG. 1. FIG. 2 shows a circuit 64 having the same video terminal 30, video pass transistor 28, diode 32, capacitor 34 and resistor string 36,38 as in FIG. 1. In the memory/driver circuit 64 of FIG. 2, the enabling circuits for the video pass transistor 28 are shown to comprise an exclusive AND gate 66 to which the horizontal and vertical terminals 20 and 22 are connected; and a buffering amplifier 68. The outputs of each of AND gate 66 and buffering amplifier 68 are such that the presence of signals at terminals 20 and 22 results in the presence of a signal at the base of transistor 28.

A field effect transistor (FET) 70 is shown with its base connected to terminal 40 of the RC circuit comprising capacitor 34 and resistor string 36,38. The FET 70 is used to provide higher current capabilities with respect to the input to the comparator 72 which is derived from the FET 70. Thus, the FET 70 is also used as a buffering output or source follower with respect to the voltage at point 40.

The other, low, terminal of the comparator 72 is connected to a reference voltage terminal 74. The output of the comparator 72 is connected to a solid state switch such as, for example, the Darlington pair 76,78. The lamp 12a is connected in series with the lower transistor 78 of the Darlington pair, and in series with the DC power supply.

The AND gate 66 and the buffering amplifier 68 are provided so as to give a voltage interface from low voltage horizontal and vertical sync pulses and the higher voltage at DC terminal 14. In other words, the amplifier 68 functions as a level shifter.

The operation of the circuit of FIG. 2 is analogous to the operation of the circuit of FIG. 1, except that it is in reverse to that operation. In other words, the circuit of FIG. 2 operates to illuminate the lamp 12a in the presence of a video signal at terminal 30 — above a specified threshold as determined by reference voltage at terminal 74 — as opposed to the holding off of the illumination of the lamp 12 of FIG. 1 in the presence of a video signal at terminal 40 above the reference voltage on capacitor 62 in FIG. 1. Thus, when the video pass transistor 28 is made conductive, the video signal from terminal 30 is immediately applied to the capacitor 34, and is passed through FET 70 to the comparator 72 whereupon the Darlington pair 76,78 is made conductive and the lamp 12a is illuminated. The sampling time of the video terminal 30 is determined, as noted above, with respect to FIG. 1, by the number of lamps 12a that there may be in any given horizontal line. However, when the pass transistor 28 becomes non-conductive after sampling at terminal 30 is completed, the output from comparator 72 may remain high as long as the voltage at point 40 remains higher than the voltage at the reference terminal 74. Thus, in the circuit of FIG. 2, the video information is displayed at each lamp by immediate illumination of the lamp and a determination of the turn-off time as a function of the video signal.

Adjustment of the reference voltage at terminal 74 — and, therefore, adjustment of the turn-off time of comparator 72, achieves a compensation for day or night brightness of a video display apparatus which includes the memory/driver circuits of FIG. 2.

Figure 4:
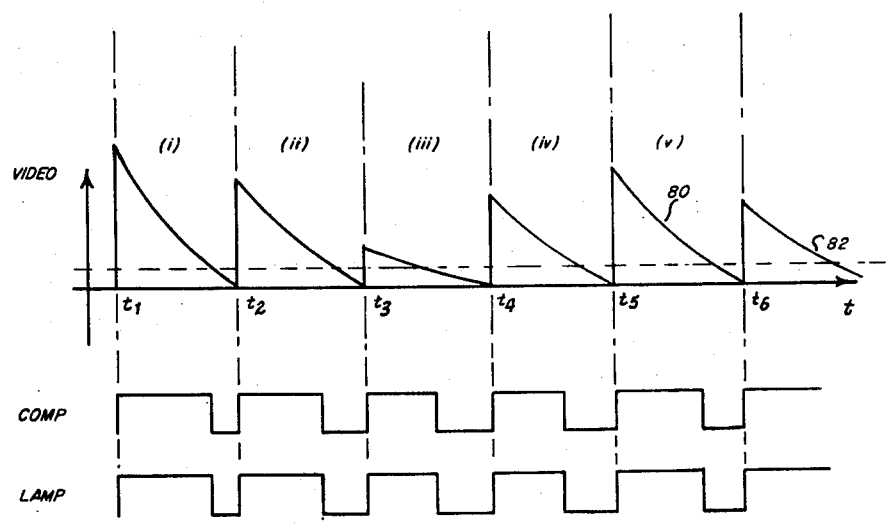
FIG. 4 is a series of curves showing the operation of a comparator and lamp of FIG. 2 in association with a video signal, over several cycles of operation of that circuit.
Figure 5:
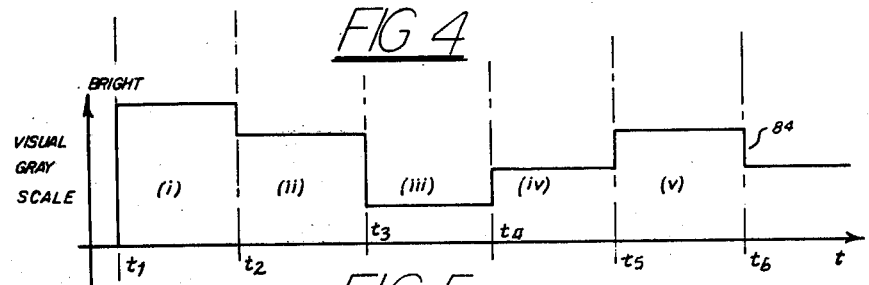
FIG. 5 shows the visual gray scale which is observed over the cycles of operation of the lamp of the circuit of FIG. 2.
Figure 6:
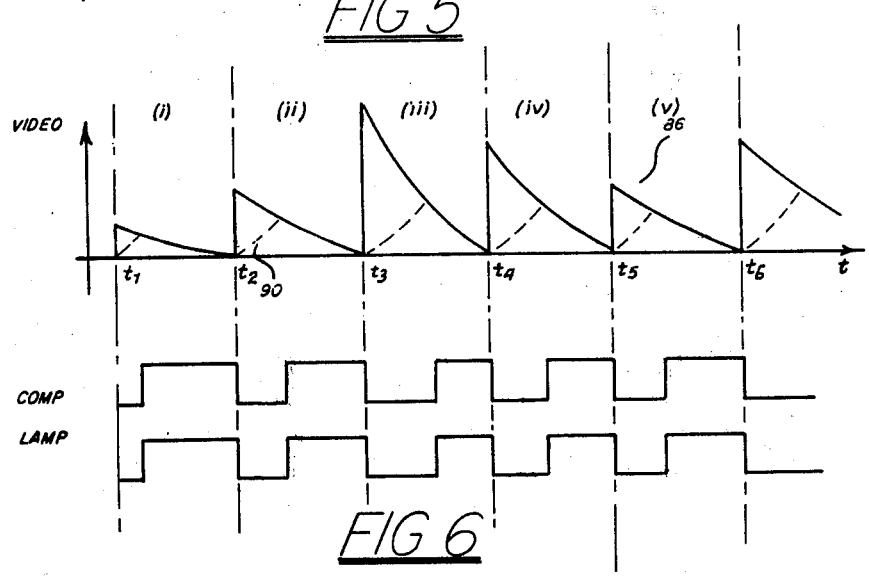
FIG. 6 is a series of curves similar to those of FIG. 4 and showing the comparator and lamp operations during similar cycles with the identical visual gray scale observed at the lamp of the circuit of FIG. 1 as is shown in FIG. 5.

Turning now to FIGS. 4, 5 and 6, and referring first to FIG. 5, it will be noted that FIG. 5 shows different levels of brightness of a lamp 12 or 12a, indicated on a visual gray scale, as seen by the eye of an observer. It will be noted that the different levels of brightness are each for one cycle of operation of the illumination of the respective lamp.

Referring to FIG. 4, there is shown a curve of a video signal which is shown to be a ramped signal — and which, in essence, is an indication of voltage at the point 40 in FIG. 2; as well as curves showing the output of the comparator 72 and the operation of the lamp 12a. The video signal at point 40 ramps downwardly from different maximum values as determined in each of the cycles of operation of the lamp and which are numbered i through v. The comparator output is shown to be high — i.e., the comparator 72 is conductive, during those periods of time when the video signal 80 is above the reference level 82. During those periods of time when the reference level 82 exceeds the level of the video signal 80 at point 40, the comparator is non-conductive and the lamp is also non-conductive. It will be seen that the longest period of conduction of the lamp 12a is in period i (i.e., from time $t_1$ to $t_2$), and the shortest period of conduction of the lamp 12a is in period iii (i.e., from time $t_3$ to $t_4$); and it will be noted from FIG. 5 that the observed brightness of the lamp is the greatest in period i and the least in the period iii. The observed brightness, as noted above, lasts over the entire period until the lamp is reilluminated, because of persistence of vision in the eye of the observer.

The curve of brightness 84 shown in FIG. 5 is also relevant to FIG. 6 which shows the operation of the lamp 12, the comparator 42 and a video signal at point 40 in FIG. 1. In these curves, the video signal 86 declines from various levels to a reference voltage 88 which may be constant, or which may ramp upwardly as shown in dotted lines 90 in each of the periods of operation shown in FIG. 6. In this case, it will be noted that at first, in each period, the comparator output is low because the comparator is non-conductive, and the lamp is accordingly not illuminated. However, as noted above, the SCR 50 is conditioned to be turned on by the appropriate voltage characteristics at terminals 54 and 56; and during those periods of operation as shown, the lamp is turned on at various times throughout the different periods. Phase modulation is thereby accomplished — as opposed to pulse width modulation shown in FIG. 4 and with reference to FIG. 2 — but the observable visual gray scale brightness, as noted in FIG. 5, remains substantially the same.

Figure 3:
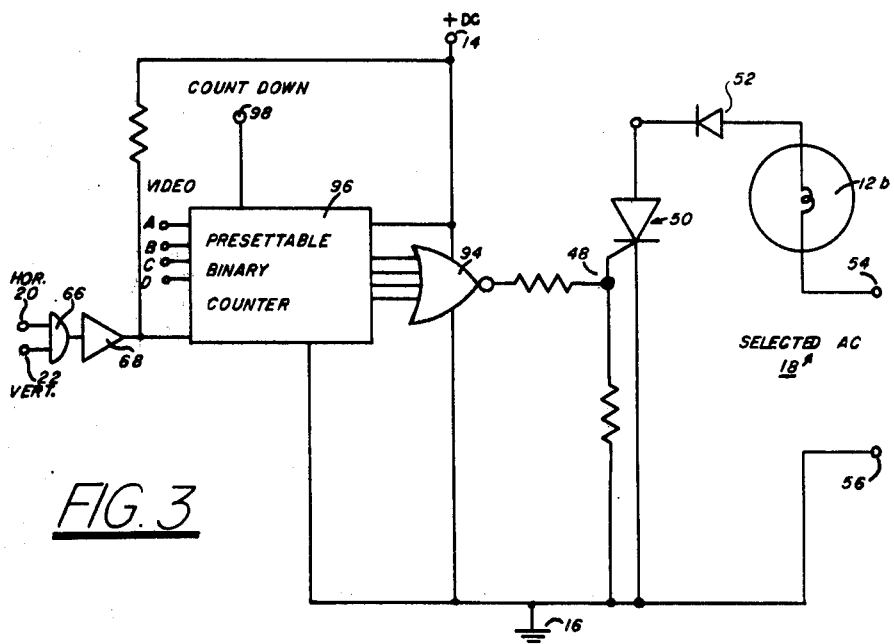
FIG. 3 shows yet another embodiment of a memory and driver circuit according to this invention having AC operation and a discreet video signal level.

Referring now to FIG. 3, there is shown a digital system having phase control of an AC operated lamp 12b. In this circuit, the lamp 12b is in series with the power source 18, diode 52 and SCR 50 — in the same manner as in FIG. 1. The gate terminal 48 of the SCR 50 is fed from the inverting output of a four-input NOR gate 94, which is connected to ground 16 and DC terminal 14. Conditioning inputs including AND gate 66 and level shifter 68 are shown.

The video information in the circuit of FIG. 3 is, in this case, provided on four lines noted as A,B,C,D; and they are connected to a presettable binary counter 96. A countdown terminal 98 is also connected to the counter 96. Assuming the operation of the SCR 50 to be the same as in FIG. 1, it will be noted that when the output from gate 94 goes high — it being an inverted output — the SCR is fired and lamp 12b is illuminated. Discreet multi-bit video signal level information is fed on lines A,B,C and D into the presettable binary counter 96. At any instant in time, one of sixteen different levels of information may be supplied. When the information has been read into the counter 96, a countdown pulse is fed to terminal 98, and the decade counter counts down until it gets to a O,O output which is the coincidence of the number just counted from terminal 98 and the discreet video signal level information applied from lines A,B,C and/or D. The rest of the circuit operates in the manner discussed above with reference to FIG. 1.

It should be noted that the circuit of FIG. 3 is such that the screen is split into two, where one half of the screen is displayed at any one time with the discreet level information being fed to the other half of the screen at the same time. In other words, the level information is fed into the presettable binary counter 96 during a first half cycle of operation with reference to the input power, and in the second half cycle the lamp 12b is illuminated at the time that a O,O output is achieved from the decade counter as the countdown continues — thereby achieving phase control. There are, as is readily apparent, sixteen discreet gray tones available and 16 different times during the respective half cycle of operation in which the lamp 12b will be illuminated that the lamp will turn on. Current averaging, and lower total power consumption — comes about by reading in video information for one half of the screen and displaying video information on the other half of the screen during each half cycle. The operation is then flip-flopped during the other half cycle of operation, and it will be noted that lamp 12b may be illuminated at a rate of 60 pulses per second so that no flicker will appear and a very steady picture is observed.

In all circuits, the extinguishing characteristics of the lamps are sufficiently fast, especially in smaller lamps such as 60 volt lamps rated at 20 to 40 watts, that no ghosting or image retention is apparent during the turn-off period of the lamps before the next display period occurs.

Each of the AC-operated circuits of FIGS. 1 and 3 is such that the lamps are turned on all at one time for a complete screen or a portion of the screen; whereas the lamp illumination in the circuits of FIG. 2 is such that as each video terminal 30 is addressed, the respective lamp 12a is immediately illuminated. Thus, for a video display apparatus using the DC circuits of FIG. 2, there is current averaging over the whole circle of operation with respect to an AC input power; but rectified and substantially ripple-free DC current is required for operation of the memory/driver circuits.

It should also be noted that the SCR's 50 in FIGS. 1 and 3 could be replaced with a power transistor, by connecting the base of the transistor to the gate terminal 48, and suitably connecting the emitter and collector terminals of the transistor depending upon the polarity thereof.

There have been shown several alternative circuits which serve as memory and driver circuits for each individual lamp of a plurality of incandescent lamps when used in a flat screen video display apparatus. Other alternative arrangements than those discussed above may be devised, without departing from the spirit and scope of the appended claims. For example, the SCR's 50 might be replaced with triacs, suitably biased, thereby precluding the necessity of a pre-selected AC input power to the lamp and conditioning of the SCR's. Also, the NOR gate 94 might be eliminated by connecting the gate terminal 48 of SCR 50 to the carry line or the borrow of a suitable counter, with appropriate count up or count down at terminal 98.

The embodiments of the invention in which an exclusive property or privilege is claimed are defined as follows:

1. A flat screen video display apparatus of the sort comprising a plurality of incandescent lamps, each of which is individually addressable in an X-Y matrix, where video information for each lamp is derived from a television signal and displayed by illuminating the lamp for a controlled period of time so as to give visual gray scale effects according to the length of time of illumination of the lamp; each lamp being connected in series with a source of power, a memory having a time constant and a driver circuit, comprising, for each lamp:

a means for detecting, storing and decaying a video signal intended for display at that lamp at the next time that the lamp may be illuminated; the stored video signal having a decay rate established by the time constant of the memory and being allowed to decay over a decay period equivalent to the vertical video field sweep period;

comparator means having inputs from said means for detecting, storing and decaying said video signal and from reference signal means; said comparator means being adapted to initiate an output signal when the values of the decayed video signal and the reference signal are coincident; the timing of the coincidence of said reference and decayed video signals being a function of the initial value of the video signal and of the memory decay time constant; and solid state switching means connected to the output of said comparator means and in series with said lamp and said source of power, so as to control the period of illumination of said lamp.

2. The apparatus of claim 1, where said means for detecting, storing and decaying said video signal comprises and enabling circuit having horizontal and vertical address sensing means so as to turn on a video pass switch only when both horizontal and vertical signals are coincident; said switch being connected to a source of video signals and to an RC circuit adapted to charge the capacitor thereof when said video pass switch is conductive, and to discharge said capacitor when said video pass switch is non-conductive; the output of said RC circuit being one input to said comparator means.

3. The apparatus of claim 2, where said source of power is an alternating current source having only pulses whose initial slope is always in the same sense with respect to zero voltage; and where said solid state switching means is connected so as to be made non-conductive at the end of each pulse and to become conductive only when there is an output from said comparator.

4. The apparatus of claim 2, where said solid state switching means is an SCR whose gate is connected to said comparator output, and the inputs of said comparator are connected to said RC circuit and to a reference signal source so that said comparator becomes conductive at a time when said video signal input from said RC circuit has decayed to coincidence with said reference signal.

5. The apparatus of claim 2, where said reference signal is derived from said source of power through said lamp and a series resistor and across a parallel RC circuit; so that said comparator becomes conductive at a time determined by the coincidence of decay of said video signal and the rise of said reference signal.

6. The apparatus of claim 2, where said source of power is a direct current source; and where said solid state switching means is connected so as to become conductive when there is an output from said comparator, and non-conductive when there is no output from said comparator; and the inputs of said comparator are connected to said RC circuit and to a DC reference signal source so that said comparator is conductive when said video signal input from said RC circuit is at least as high as said reference signal.

7. The apparatus of claim 6, where said solid state switching device is a Darlington pair.

8. The apparatus of claim 1, where said means for detecting, storing and decaying said video signal comprises a multi-line input into a counter for inserting discrete multi-bit video signal level information into said counter, an enabling circuit for rendering said counter operative only upon the coincidence of horizontal and vertical signals associated with said video signal; and a count-down circuit for causing said counter to count digitally downward so as to decay said stored video signal, and to provide an input signal to said comparator means.

9. The apparatus of claim 8, where said source of power is an alternating current source having only pulses whose initial slope is always in the same sense with respect to zero voltage; and where said solid state switching means is connected so as to be made non-conductive at the end of each pulse and to become conductive only when there is an output from said comparator means.

10. The apparatus of claim 9, where said solid state switching means is an SCR whose gate is connected to the output of said comparator means, said comparator means output being an inverting output; and where said comparator means output occurs upon coincidence of a digital count and said decayed discrete video signal level information.

* * * * *